Patented June 18, 1940

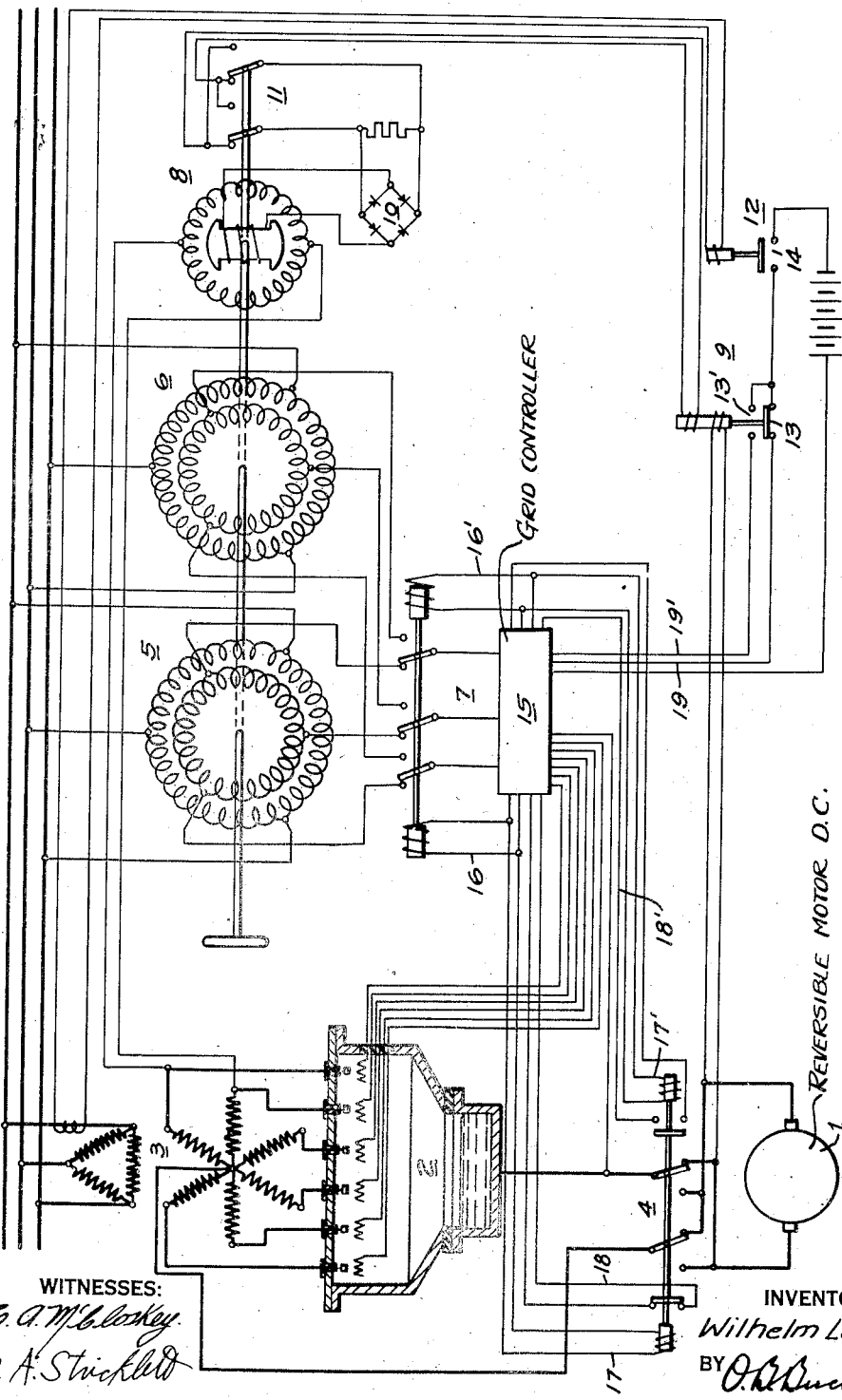

2,205,214

UNITED STATES PATENT OFFICE

2,205,214

MOTOR CONTROL SYSTEM

Wilhelm Leukert, Berlin-Siemensstadt, Germany, assignor to Westinghouse Electric & Manufacturing Company, East Pittsburgh, Pa., a corporation of Pennsylvania Application October 13, 1937, Serial No. 168,785
In Germany October 13, 1936

5 Claims. (Cl. 172—179)

My invention relates to a control system and particularly to a control system for automatically changing-over the control of a converter supplying electrical energy to a reversible electric motor drive.

The so-called Ward Leonard converter has heretofore been employed for supplying energy to direct current motors which are coupled to large flywheel masses which must be frequently braked and reversed in operation. Recently the rotating Ward Leonard converter has been replaced by static converting equipment utilizing grid controlled gas or vapor discharge devices. The replacement of the Ward Leonard converter may be completely carried out by providing discharge devices employing the so-called cross connection, that is, providing two separate discharge devices or groups of discharge devices, one of which is continuously controlled as a rectifier whereas the other is continuously controlled as an inverter. Economic grounds make it appear advisable in many cases not to utilize the cross connection which requires at least two discharge devices, but to provide only a single arc discharge converter for supplying energy to the motor. The single converter then must be controlled at will either as an inverter or as a rectifier, which must be switched over when the change in the flow of current occurs in the direct current or motor circuit.

The characteristic of the motor operation, as is known, consists in the fact that the electromotive force of the power source as, for example, the Ward Leonard converter, is greater than the counter electromotive force of the motor. In contrast to this, the braking operation is characterized by the fact that the electromotive force of the motor is greater than the electromotive force of the power source supplying energy which then, in turn, acts as a counter voltage. Therefore, if the control lever controlling the potential of the source is pulled back in the sense of potential decrease during motor operation in an electric motor drive which is fed through a Ward Leonard converter or converter arrangement in cross connection, the braking operation takes place in that the counter potential of the converter becomes smaller and the electromotive force of the direct current motor, which by reason of the inertia masses, at first remains practically constant. At this instant, the current in the motor and the converter is reversed. Where only one rectifier device is utilized for motor and braking operation, such current diversion is not possible without additional apparatus by reason of the valve effect of the discharge paths, but for this purpose the direct current connections between the rectifier and the motor must first be reversed.

It is to be understood in this connection that a reversal of the current, which is a characteristic for the occurrence of the braking operation in the case of a Ward Leonard converter and of the cross-connected converter system, cannot be considered as a criterion for the proper moment at which the changing over is to be effected. According to my invention, the fact that the difference between the electromotive force of the converter and the electromotive force of the motor reverses its sign is used as a change-over criterion for the single converter which is capable of being switched over to supply energy to the motor or to return energy from the motor to the source.

The electromotive force of the motor at the instant at which the regenerative braking should take place may be measured without difficulty for at this instant the motor current is substantially equal to zero. The counter electromotive force of the converter controlled as the inverter cannot be readily determined however because of the valve effect.

According to my invention, it is, therefore, proposed to provide a regulable auxiliary potential source whose voltage depends upon the position of the regulator lying in the control circuit of the converter in such a manner that there is always a measure for the degree of control of the converter as well as to provide a supervisory device which determines the proper moment in which the switching over is to be effected by comparing the voltage of the auxiliary voltage source with the potential of the direct current machine.

It is to be understood that the thought of supervising the electromotive force of the converter by an auxiliary source, which depends upon the grid regulation of the rectifier, is in no way limited to the solution of the present problem, but may be utilized in all cases where any switching operations are to be effected in accordance with the no-load voltage of the converter. In carrying the invention into practice, the regulating member of the auxiliary voltage source is coupled to the regulating member acting on the grid voltage of the converter in such manner as to be capable of adjustment in common. In order that the fluctuation in the alternating current supply of the voltage may be considered when determining the proper moment at which the switching over is to be effected, the auxiliary voltage source is preferably so designed that its voltage is proportional to the supply voltage of the converter. By connecting the auxiliary voltage source to the supply terminals of the converter, any already existing voltage regulation or step switching is automatically taken into consideration.

Other objects and advantages of my invention will be apparent from the following description, taken in conjunction with the accompanying drawing, in which The single figure is a diagrammatic illustration of a control system according to my invention.

According to the illustrated embodiment of my invention, the motor 1 is fed with direct current from a three-phase supply circuit through a converter 2 fed by a transformer 3. The converter 2 is capable of being switched over in its direct current circuit by means of the change-over switch 4 so as to change at will the modes of operation and the direction of rotation of the motor 1. For the control of the converter 2, a special induction regulator 5 is provided for the rectifier operation and a similar induction regulator 6 for the inverter operation. Both induction regulators are coupled to each other in such a manner that the same converter voltage corresponds always to the position of one regulator as to the position of the other. Of the two induction regulators 5 and 6, only one is connected to the grid circuit of the converter 2, depending upon the mode of operation of the converter. To this end, the selector switch 7 is provided which connects either the one or the other of the two induction regulators. The selector switch 7 is operated at the same time as the reversing switch 4, when changing the flow of current.

Coupled with the two induction regulators 5 and 6 is a single-phase inductor regulator 8 serving as a standard voltage source whose primary winding is directly connected to the alternating-current terminals of the converter 2. The single-phase induction regulator 8 has the property, as is well known, of supplying a secondary auxiliary voltage variable as to its amplitude in proportion to the angle of displacement of a secondary to its primary, the secondary voltage being multiplied by the cosine of the angle of displacement. Since, however, as is well known, the direct-current voltage of the converter 2 is proportional to the cosine of the retardation angle of ignition and since, on the other hand, the retardation angle of ignition is proportional to the angle of displacement of the induction regulators 5 and 6, the secondary voltage of the single-phase induction regulator 8 varies in exactly the same proportion as the no-load voltage of the converter 2. While I prefer to use the induction regulators 5 and 6 any other suitable phase displacing means may be utilized, for instance, the induction regulators may be replaced by suitable adjustable resistance networks and also the single phase induction regulator 8 may be replaced by any regulable standard voltage source. The point is that the coupling between both be such that the standard voltage source is always a measure of the no-load voltage of the converter. The voltage of the single-phase induction motor regulator 8 is compared with the direct-current motor 1 by means of the differential relay 9. The voltage of the regulator 8 as well as the voltage of the motor 1 act in opposite directions on positioning the relay 9. For simplicity of operation, the alternating voltage of the single phase induction regulator 8 is preferably rectified. For this purpose, the tube arrangement 10 is provided in the so-called Graetz (full wave) connection which produces a voltage drop across a resistance proportional to the voltage of the induction regulator 8.

When the angle of ignition is adjusted to such an extent that the mode of operation of the converter corresponding to each of the two induction regulators 5 and 6 changes a change in the direction of rotation of the direct current motor results. Since, in this case, the direct curent motor 1 acts on the differential relay 9 with inverse polarity, the polarity of the standard voltage source 8 must also be reversed. For this purpose, the reversing switch 11 is provided which is directly coupled to the operating means of the standard voltage source 8 and when the above-mentioned retardation angle of ignition is exceeded, the switch 11 reverses the polarity of the standard voltage source 8.

While I prefer to rectify the standard voltage before comparison, it is, of course, possible to directly compare the alternating current potential of the regulator 8 with the direct current potential of the motor 1 by means of suitable relays.

An under current relay 12 is provided in order to enable a change-over from one mode of operation to another when the current has been reduced to a minimum value or has completely disappeared. The under current relay 12 may have its winding connected either to a current transformer in the primary lead of the converter transformer 3, (as shown), or to a shunt in the cathode circuit so that it prevents the change-over when the current in the supply lead exceeds a predetermined value.

The operation of the system is as follows: It is first assumed that the standard voltage 8 is greater than the electromotive force of the motor 1. The converter 2 then supplies current and motor operation is present. The differential relay 9 maintains its contacts 13 closed. If now the control of the converter 2 is so changed that its electromotive force becomes smaller also, the standard voltage decreases and the electromotive force of the motor 1 exceeds the standard voltage 8. This is a sign that an excess of current has occurred in the motor 1. The differential relay 9 changes over thereby closing its upper contact 13'. At the same time, the under-voltage relay 12 will drop and bridge its contacts 14. The circuit is then established in which a current flows to the grid locking device through the contacts 14 and the contacts 13'. This first effects a locking of the converter 2 by impressing the grids with blocking potential, at the same time a circuit is established over which current flows to the operating coils of the selector switch 7 and reversing switch 4 through conductors 16' and 17'. Both the reversing switch 4 and the selector switch 7 change their positions.

The operation of the reversing switch 4 closes an auxiliary contact coupled therewith which releases the grid locking device through the conductor 18' so that the converter is controlled with the mode of operation corresponding to the position of the induction regulator 6. If, after a certain time, the electromotive force of the converter 2 again exceeds the electromotive force of the motor 1, the differential relay 9 closes its contacts 13, locks the the converter 2 through the conductor 18 and energizes the reversing switch 4 and selector switch 7 through the conductors 16 and 17. The reversing switch 4 eliminates the grid lock through the conductor 18.

While my invention is of particular importance to converter systems having individual control means for each mode of operation, it may, however, be used in such converters which are capable of being reversed and in which a single control apparatus controls both modes of operation and whose position must be accordingly changed when changing over the rectifier circuit.

I claim as my invention:

1. A control system for automatically reversing the operating conditions of a vapor electric converter supplying energy to an electric motor drive utilizing regenerative braking, comprising an arc type converter, a direct current motor, a reversing switch for connecting said converter to said motor, control electrodes associated with said converter, a control circuit including a plurality of phase controllers for supplying control energy to said control electrode, a selector switch for selectively connecting said phase controller to said control electrodes, an auxiliary voltage source having a potential dependent upon the position of said phase controller, means for comparing said auxiliary voltage with the voltage of said motor, said comparing means being operative to determine the position of said selector switch and said reversing switch.

2. A control system for a reversible direct current motor with regenerative braking comprising a direct current motor, a source of alternating current, a multi-valve converter for transferring energy between said source and said motor, control grids associated with the valves of said converter, a grid control system including two phase regulators which vary the control voltage according to the cosine of the angle of displacement of said regulators, a selector switch for selectively connecting said regulators to said grids, a change-over switch between said converter and said motor, a single phase induction regulator fed by the alternating current supply for said converter and relay means for comparing the output voltage of said single phase induction regulator and the terminal voltage of said motor.

3. A control system for controlling the flow of electric energy between an alternating current source and a reversible electric current motor employing regenerative braking comprising a direct current motor, an alternating current supply source for said motor, a multi-valve converter connected between said source and said motor, control electrodes asociated with the valves of said converter, control means for supplying control impulses to said control electrodes comprising two induction phase regulators displaced 180 electrical degrees in phase relation, a selector switch for selectively connecting said regulators to said control electrodes, a reversing switch, connected between said converter and said motor, a single phase induction regulator fed from the alternating current supply of said converter, means for rectifying the output potential of said single phase inductor regulator, relay means for comparing the output potential of said single phase induction regulator with the terminal potential of said motor, said relay means being operative to determine the position of said selector switch and said reversing switch.

4. A control system for a reversible direct current motor with regenerative braking comprising a source of alternating current, a direct current motor, a multi-valve converter for transferring energy between said source and said motor, control grids associated wtih the valves of said converter, a grid control system including two phase regulators which vary the control voltage according to the cosine of the angle of displacement of said regulators, a selector switch for selectively connecting said regulators to said grids, a change-over switch between said converter and said motor, a single phase induction regulator fed by the alternating current supply for said converter, means for rectifying the output voltage of said single phase induction regulator and relay means for comparing the rectified output voltage of said single phase induction regulator with the terminal voltage of said motor.

5. A control system for controlling the flow of electric energy between an alternating current source and a reversible electric current motor employing regenerative braking comprising a direct current motor, a source of alternating current for said motor, a multi-valve converter connected between said source and said motor, control electrodes associated with the valves of said converter, control means for supplying control impulses to said control electrodes comprising two induction phase regulators displaced 180 electrical degrees in phase relation, a selector switch for selectively connecting said regulators to said control electrodes, a reversing switch, connected between said converter and said motor, a single phase induction regulator fed from the alternating current supply of said converter, means for rectifying the output potential of said single phase inductor regulator, relay means for comparing the output potential of said single phase induction regulator with the terminal potential of said motor, said relay means being operative to determine the position of said selector switch and said reversing switch, and a relay responsive to the current flowing between the alternating current source and the motor for inhibiting movement of said selector switch and reversing switch until the current has decreased below a predetermined value.

WILHELM LEUKERT.